United States Patent

Verbeek et al.

[11] Patent Number: 6,017,228

[45] Date of Patent: Jan. 25, 2000

[54] ELECTRICAL STATION

[75] Inventors: Steve Verbeek, Aurora; John Hellwig, Toronto; Genadij Makerwicz, Brampton, all of Canada

[73] Assignee: Teknion Furniture Systems Limited

[21] Appl. No.: 09/092,037

[22] Filed: Jun. 5, 1998

[30] Foreign Application Priority Data

Mar. 31, 1998 [CA] Canada ................................ 2,223,763

[51] Int. Cl.⁷ .................................................. H01R 13/44
[52] U.S. Cl. .............................. 439/142; 439/501; 174/49
[58] Field of Search ..................................... 439/142, 131, 439/501, 535; 174/49

[56] References Cited

U.S. PATENT DOCUMENTS

| | | | |
|---|---|---|---|
| 3,047,650 | 7/1962 | Reiland | 174/49 |
| 4,792,881 | 12/1988 | Wilson et al. | 439/131 |
| 5,231,562 | 7/1993 | Pierce et al. | 174/49 |
| 5,467,565 | 11/1995 | Bowman et al. | 174/49 |
| 5,516,298 | 5/1996 | Smith | 439/131 |
| 5,721,394 | 2/1998 | Mulks | 439/535 |

*Primary Examiner*—Khiem Nguyen
*Assistant Examiner*—T C Patel

[57] ABSTRACT

An electrical station provides a structure having the ability to receive power and communication cable in several different ways while maintaining the ability to change as required. The electrical station has a top open panel to expose electrical and communication receptacles located therebelow. The electrical station also includes a front opening access panel for service or better access for wire management.

10 Claims, 4 Drawing Sheets

ELECTRICAL STATION

FIELD OF THE INVENTION

The present invention relates to office furniture products and in particular, relates to an electrical station suitable for use in association with mobile work tables of an office system.

BACKGROUND OF THE INVENTION

The work place continues to undergo rapid change partially driven by the advance in computer technology and partially driven by the increasing recognition that the work space must respond to the needs of the workers. Office panelling systems or office desking systems used to subdivide an office space and continue to have a place in an office design. However, it is now recognized that in addition to furniture which is more or less fixed, it is desirable to have some furniture which is highly mobile and can complement the fixed panelling system or desking system. This mobile furniture is designed to be repositioned on a daily basis or at any point in time by the user for his own use in his particular work space or possibly to be moved to cooperate with other mobile furniture to form a temporary meeting area. Most furniture systems today recognize that fixed office panels, stand alone generally fixed office furniture, and highly mobile office furniture all have their place in the work environment.

One of the problems with highly mobile furniture, is the ability to provide power and communication cabling to such furniture given the position thereof is not fixed. Lap top computers with their own battery supply, partially address this need, however, this is often insufficient. For example if mobile tables are gathered as a conference table with several users, it would be highly desirable to have convenient power and communication capability the same as existing office systems.

Some office furniture systems have tried to address the above problem by providing generally fixed column members extending from floor to ceiling or merely extending a certain height above the floor which have internal conduits for feeding electrical power to electrical outlets accessible at the exterior of the members. Unfortunately, these structures are fixed and severely restrict many of the advantages of mobile tables as they have to be located at one of these members if power and communication capabilities are desired.

The present invention seeks to overcome a number of these difficulties and provide a solution which is flexible and can cooperate with the work environment where the power and communication capability has several different source locations, all of which require a specialized structure to cooperate therewith.

SUMMARY OF THE INVENTION

An electrical station according to the present invention, provides power and communication receptacles for connecting with various types of office equipment. The electrical station comprises a housing having an interior electrical raceway and a cooperating communication passageway for receiving and retaining low power communication tables. The electrical raceway on a face thereof includes electrical receptacles into which electrical plugs of office equipment can be releasably connected and concealed within the housing. The housing includes an access panel which forms part of the vertical walls of the housing and the access panel is movable to provide convenient access to the interior of the housing. The housing includes a slot arrangement through which office equipment cabling can pass for connection to the receptacles. The housing includes a storage area interior to the housing where excess office equipment cabling can be temporarily stored and connected to the electrical station.

According to an aspect of the invention, the electrical station has a movable top panel for accessing electrical receptacles of the electrical raceway.

According to further aspect of the invention, the electrical raceway extends across the housing at an intermediate point and is spaced below the movable top panel a sufficient distance that electrical plugs can connect with electrical receptacles located in the top of the electrical raceway without interfering with the movable top panel.

According to yet a further aspect of the invention, the top surface of the electrical conduit includes both electrical receptacles and communication receptacles.

According to yet a further aspect of the invention, the housing includes a top surface with an access port therein for receiving an electrical raceway which provides power to the electrical raceway of the station from above the station.

According to yet a further aspect of the invention, the housing includes an opening at the base thereof, interior to the housing, through which an electrical floor monument can extend. This provides a convenient way for providing power to the electrical station.

According to yet a further aspect of the invention, the electrical station includes its own electrical cable with a suitable plug thereon for connecting with an existing electrical receptacle.

According to yet a further aspect of the invention, the electrical conduit and the various electrical receptacles of the electrical station, define an electrical circuit, and a circuit breaker is provided which is accessible on the exterior of the raceway for controlling of the circuit.

According to yet a further aspect of the invention, the housing at the base of the access panel includes a slot gap through which electrical cord can pass adjacent the base of the housing.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
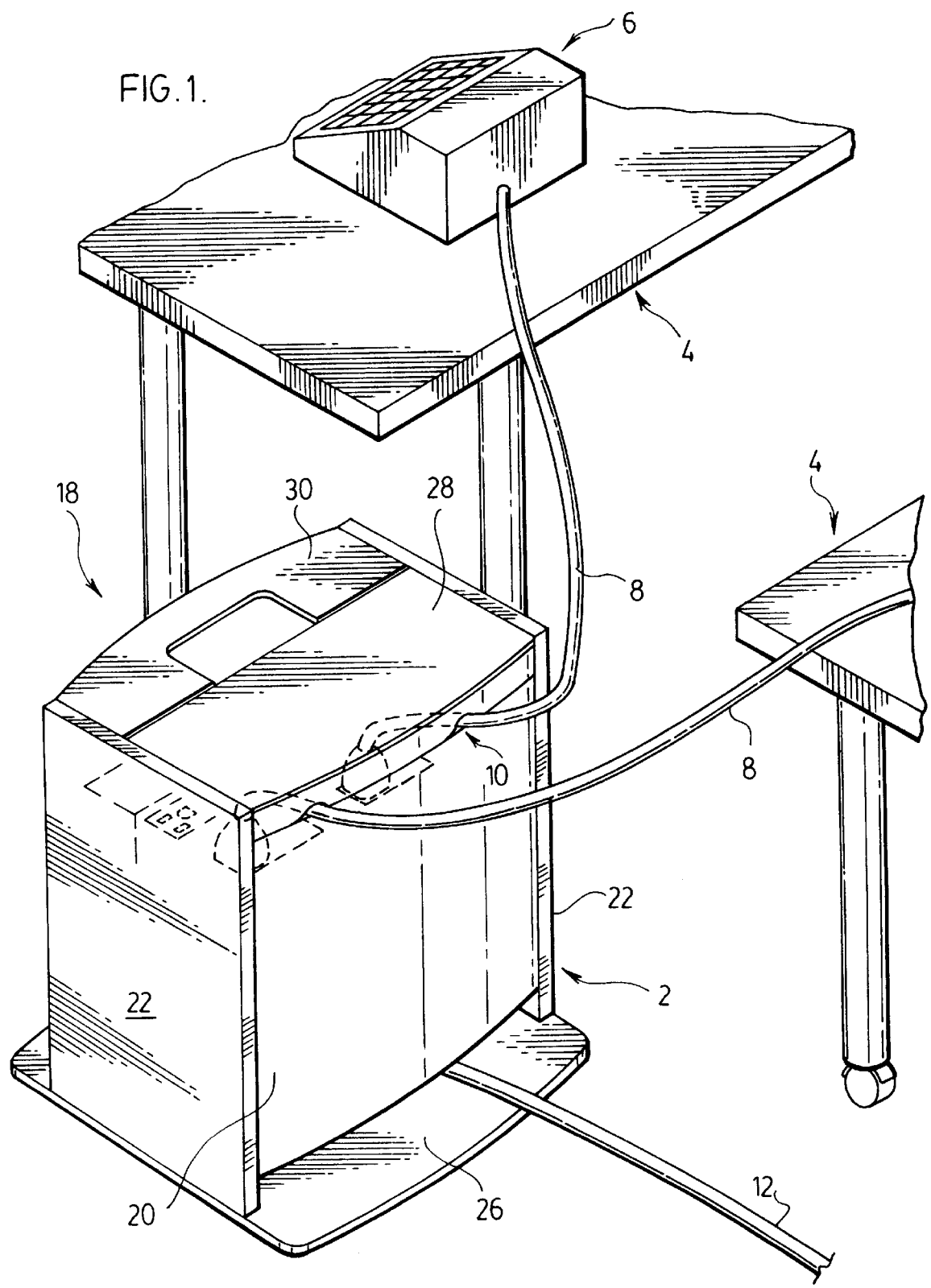
FIG. 1 where two mobile tables are shown with power being provided to the tables of the electrical station.

The electrical station 2 is shown in FIG. 1 and provides power to various office equipment generally shown as 6 provided on mobile tables 4. The electrical station 2 is preferably of a height less than 26 inches and this allows most tables to pass over the top surface of the electrical station. In this way, the tables do not have to abut the surface of the work station and can actually overlap the electrical station. The mobile tables can support a host of different types of office equipment from computers and telephones, to projectors, monitors, adding machines, etc. These office devices require electrical power for operation and suitable receptacles are provided in the interior of the electrical station. Some of these devices require telephone communication capability or communication with a computer network and suitable connections are also located in the interior of the electrical station. Various cables 8 are shown passing through an access slot 10 in the electrical station and the plugs of the equipment are shown connected with electrical receptacles interior to the station.

Figure 2:
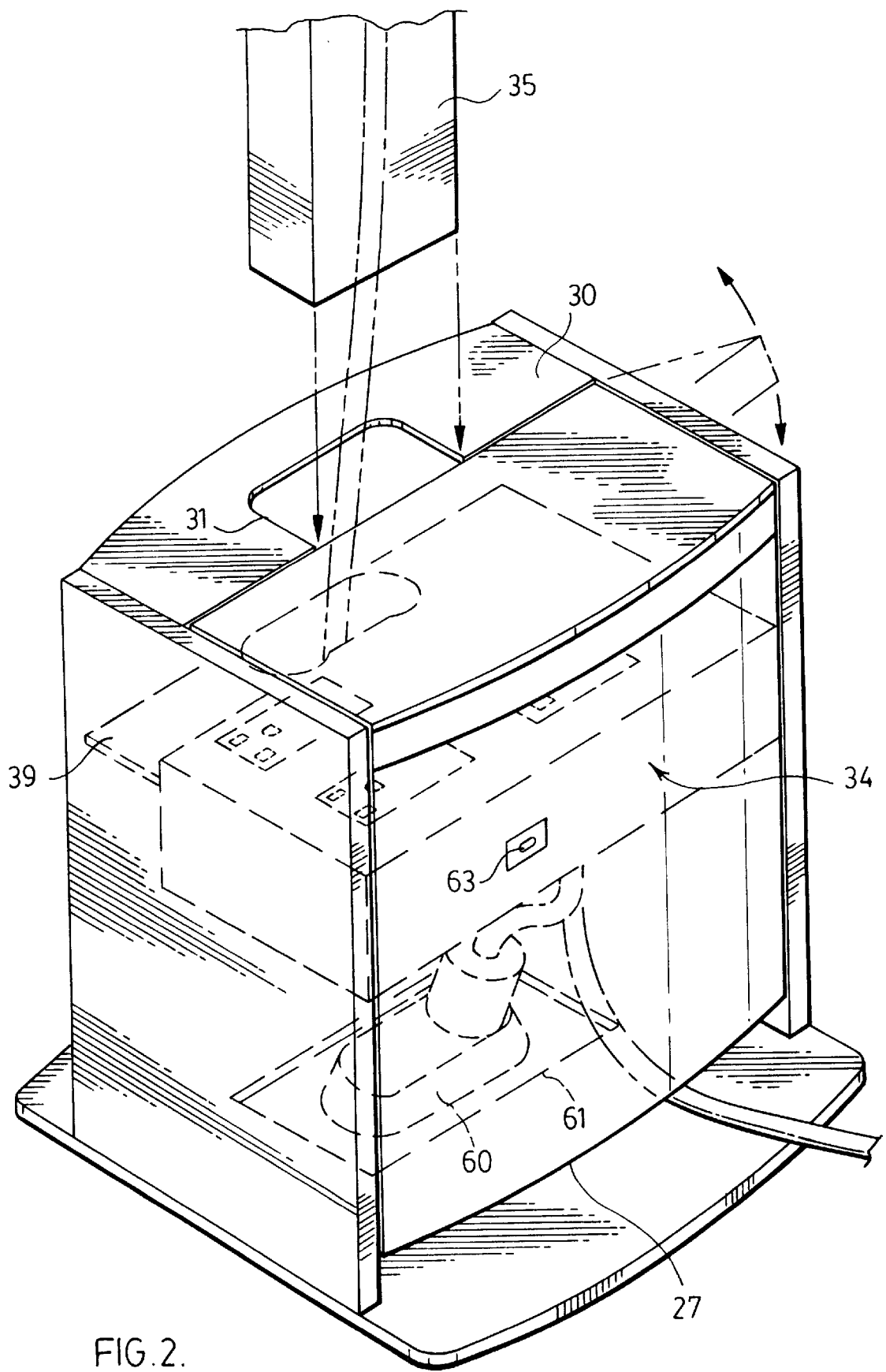
FIG. 2 is a perspective view illustrating various features of the electrical station.

The electrical station defines a housing 18 defined by a front access panel 20 (which is shown in FIG. 2 as hingedly secured to the housing), opposed vertical sides 22, a back panel 24, a base 26, a movable top panel 28 and a stationary top panel 30. Interior to the housing, is an electrical raceway 34 which has a removable plate for providing good access to the raceway through the side of the raceway. As shown, the raceway is positioned intermediate the height of the electrical station and is significantly spaced downwardly from the movable top panel 28 and the stationary top panel 30, such that electrical plugs of office equipment can easily be connected with electrical receptacles provided in an upper surface of the raceway.

The electrical raceway 34 is positioned below and interior to the front and back edges of the movable top panel 30 which acts as a roof above the raceway. In addition, the raceway is significantly separated from the front access panel 20 and the back panel 24. This arrangement protects the raceway from accidental liquid spills.

Preferably, the vertical face of the raceway behind the curved front access panel 20 is removable to provide access to the raceway by an electrician. The circuits within the raceway are preferrably factory installed and a circuit breaker 63 can be provided on a surface of the raceway, which is accessible by the user. The raceway 34 also serves as a structural member connecting the opposed sides of the housing. This allows the back panel and the front panel to be removed.

Figure 3:
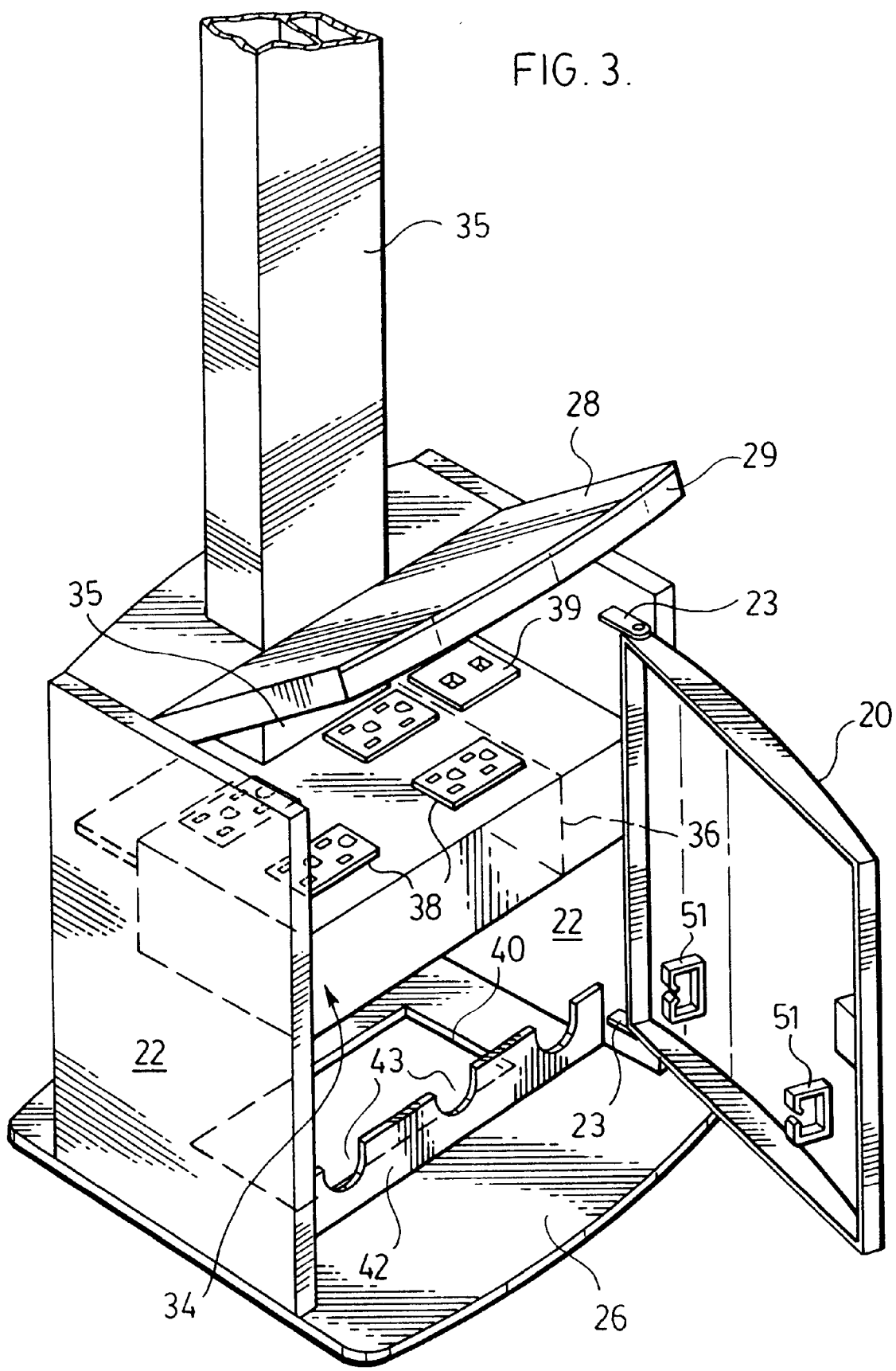
FIG. 3 is a perspective view of the electrical station showing a top down power feed to the electrical station and various access panels of the station being open to expose the interior of the station.

As shown in FIG. 3, the raceway 34 is partitioned to define an electrical raceway having electrical receptacles 38 to one side of a partition 36 and a communication raceway to the opposite side of the partition 36. The communication raceway cooperates with the communication receptacles 39 to allow user connection of communication wiring.

Figure 4:
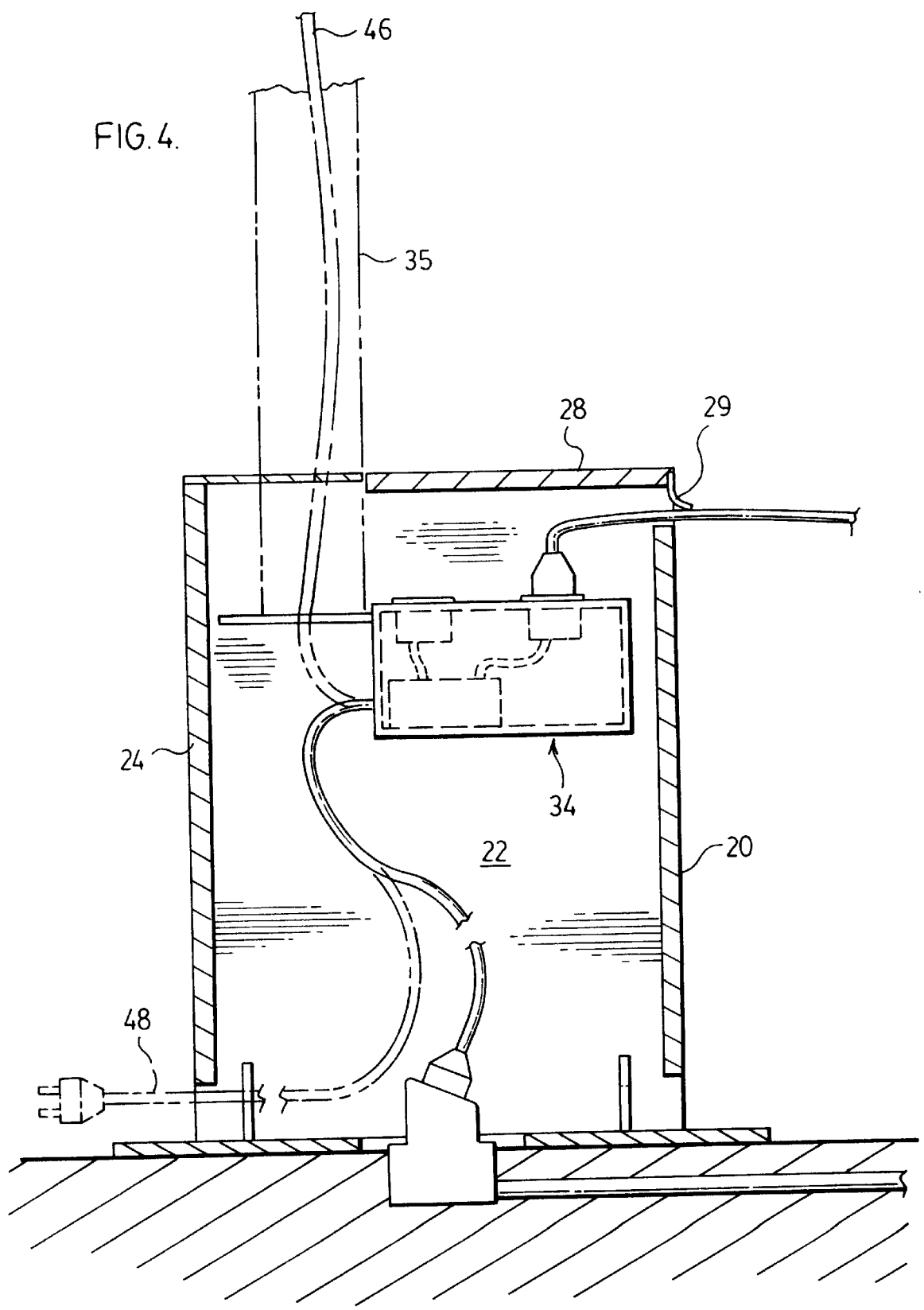
FIG. 4 is a partial sectional view of the electrical station showing various arrangements for providing power to the station.

The hinged movable top panel 28 as shown in FIG. 3, when moved about the hinge connections 23, exposes the electrical receptacles 38 and exposes the communication receptacles 39. In some cases, there are only knockout ports for VDM receptacles which are field installed. The hinged top panel provides a user with convenient access to make the necessary electrical and communication connections with the electrical station with the plugs of the equipment located within the housing. A gap exists between the front edge of the movable top panel 28 and the upper edge 23 of the movable access door 20. A gasket member 29 is provided to partially cover and seal this slot and the gasket is deformable as generally shown in the section of FIG. 4 to allow electrical wiring and cords to pass out of the slot. A gap also exists between the bottom edge 27 of the front access panel 20 and the cross-member 42 located at the base of the electrical station. As shown in FIG. 2 and FIG. 4, an electrical cable of office equipment can pass beneath the access door if desired. One such cable is shown as 12 in FIG. 1.

The back panel 24 also has a slot adjacent its lower edge and this can be used for supplying power to the electrical raceway as generally shown by the supply cable 48.

The electrical station c an al so be connected to power and communication wiring available at the ceiling by using a split vertical conduit or pole which carries electrical, voice and data wires from the ceiling height down into the station. One such electrical pole is shown as 35 in FIGS. 2, 3 and 4. With this type of supply arrangement, an electrical supply 46 (armoured cable for example) is provided from the ceiling down through the electrical pole 35 through the stationary top panel 30 and is supported on plate 39 attached to the electrical raceway 34. The plate 39 is located below the upper surface of the electrical raceway. The electrical supply can enter the electrical raceway through a side port in a conventional manner. The stationary top panel 30 has a removable plate which allows opening of the port 31 which receives the electrical pole 30. In this way, an electrical power feed is provided to the electrical raceway of the electrical station. Preferably the electrical pole is subdivided to separate power from communication wiring.

In some circumstances, the power supply is a floor monument, such as floor monument 60 shown in FIG. 2. The base 26 of the electrical station has an access port 61 which allows the floor monument 60 to project into the interior of the electrical station 2. It is then possible to run an electrical connection between the floor monument 60 and the electrical raceway 34 as generally shown in FIG. 2. As an alternative to an access port the electrical station can have a removable base plate which when removed allows the electrical station to be place over a floor monument.

The electrical station can receive power in a host of different manners. This power can be top down, bottom up, or a lateral feed. Top down uses an electrical conduit which passes through the upper surface of the electrical station and into the interior electrical raceway of the station. The base of the electrical station has also been adapted to allow a floor monument to be located interior to the station for one bottom feed arrangement. In addition, power can come into the electrical station by a separate lateral electrical feed, such as a power cord, which passes beneath either the front or back access panel and connects with the electrical raceway 34. To protect the electrical power circuitry within conduit 34, a circuit breaker 63 is provided. The circuit breaker typically limits the current draw to 15 amps or less.

Although the above description has discussed electrical wiring, these various ports and means for accessing the electrical station are also available to communication cabling. As can be appreciated, there is less difficulty with communication cabling due to its low power and there are less difficulties with having cables pass in or out of such a station.

The electrical station as shown in FIG. 3 can also include clips 51 for allowing winding of excess cable thereabout or excess cable may merely be stored within the interior of the electrical station. There can be access cord when the electrical station has its own power feed which when not in use, can be wound around clips 51. In other cases, there can be excess cord of office equipment connected to the station and it can merely be loosely retained within the interior of the station. With this arrangement the area around the electrical station and the cabling passing to one or more mobile tables associated with the electrical station, have a neat overall appearance with excess cords stored in the electrical station.

The electrical station as described herein can be permanently secured to the floor which would typically be the case with a top down feed system or base feed system. The base allows convenient securement of the station to a concrete floor using any of a host of conventional techniques.

The electrical station can also be movable by user from time to time and this may be the case where the electrical supply is provided to the station by its own feed cabling arrangement similar to an extension cord.

The electrical station, when located over a floor monument, can be of a permanent basis or a temporary basis, and if permanent, can easily be secured by securing the base to the underlying floor. On a temporary basis the open bottom of the station is placed over the monument.

From the above it can be appreciated that the electrical station is a free-standing structure which can either be secured to the floor or can be movable from time to time by a user. The structure allows for both base or ceiling feed and provides excellent user access to power and communication receptacles located interior to the electrical station. The electrical station also allows for control of excess cabling which may be associated with equipment connected to the station above the interior raceway and it also allows for wire management of electrical cables necessary for the station generally below the interior raceway. Power cabling is provided and/or data cabling is provided from floor, subfloor, ceiling, floor monument, floor junction box or from a wall. The electrical station is convertible for various different types of power and communication feeds and provides excellent concealed cable management. The receptacles on the top surface of the raceway allow a user a convenient direction for inserting a plug.

The electrical raceway and the various receptacles of the electrical station are preferrably prewired and when used in a stationary manner, an electrical feed may be provided to the station which requires an electrician.

The structure is relatively small and unobstructive, preferrably having a height of approximately 24 inches with a width of 18 inches and a depth of approximately 12 inches. The structure defines a housing having the working components thereof located within the housing and thus provides a finished esthetically pleasing outward appearance. The electrical station cooperates with most mobile tables which are of a height to at least partially pass over the electrical station.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A freestanding electrical station providing convenient connection to power and communication receptacles, said station comprising an enclosed housing reinforced by an interior raceway for receiving electrical power and communication wiring, said housing including an access panel which forms part of the vertical walls of said housing, said access panel being movable between an open position providing convenient access to the interior of said housing, and a closed position closing said housing; said housing further including a top panel movable between an open and a closed position, said interior raceway including in a face thereof, electrical receptacles and communication receptacles which are exposed to the interior of said housing, said housing below said interior raceway including a storage area and including an upper storage area above said electrical raceway for storage of excess cabling of office equipment connected to said station, said top panel when positioned in said open position exposing through a top opening in said housing, said electrical receptacles and said communication receptacles allowing connection of power cords of office equipment to said receptacles through said top opening, said top panel when positioned in said closed position defining a slot in a side of said cabinet and below said top panel through which power cords of office equipment can extend.

2. An electrical station as claimed in claim 1 wherein said interior raceway extends across said housing at an intermediate point and is spaced below said movable top panel a sufficient distance that electrical plugs can connect with said electrical receptacles without interfering with said movable top panel and said electrical receptacles are in a top surface of said interior raceway.

3. An electrical station as claimed in claim 2 wherein said top surface of said interior raceway includes both said electrical receptacles and said communication receptacles.

4. An electrical station as claimed in claim 2 wherein said housing includes in a top surface thereof an access port for receiving a vertical electrical conduit through which power can be provided to said interior raceway of said station from above said station.

5. An electrical station as claimed in claim 2 wherein said housing includes an opening in the base thereof interior to said housing sized for receiving an electrical floor monument within said station.

6. An electrical station as claimed in claim 5 wherein said interior raceway includes an electrical cable with a plug thereon, said electrical cable extending out of said raceway for connection to a floor monument.

7. An electrical station as claimed in claim 6 wherein said interior raceway includes a resettable circuit breaker which can be reset from the exterior of said raceway.

8. An electrical station as claimed in claim 2 wherein said housing below said access panel includes a slot gap through which electrical cords can pass.

9. A freestanding electrical station as claimed in claim 1 including port means for accepting a vertical electrical pole providing power from above said station or for accepting a floor monument within said housing.

10. A freestanding electrical station as claimed in claim 1 wherein said access panel on an interior surface thereof includes a clip arrangement for retaining excess electrical cord.

* * * * *